(12) United States Patent
Patel

(10) Patent No.: US 8,232,778 B1
(45) Date of Patent: Jul. 31, 2012

(54) INDEPENDENT, REDUNDANT OVERVOLTAGE PROTECTION FOR A GENERATOR

(75) Inventor: Daxesh K. Patel, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 9 days.

(21) Appl. No.: 13/015,698

(22) Filed: Jan. 28, 2011

(51) Int. Cl.
*H02P 9/10* (2006.01)
*H02H 7/00* (2006.01)
(52) U.S. Cl. ............................ 322/37; 322/28; 361/18
(58) Field of Classification Search ............. 322/22, 322/23, 25, 28, 37, 99; 361/18, 54
See application file for complete search history.

(56) References Cited

U.S. PATENT DOCUMENTS

| | | | | |
|---|---|---|---|---|
| 3,032,701 A | * | 5/1962 | Krausz | 322/25 |
| 4,118,749 A | * | 10/1978 | Matuzaki et al. | 361/33 |
| 4,297,739 A | * | 10/1981 | Goldin et al. | 361/55 |
| 4,973,896 A | * | 11/1990 | Shiga et al. | 322/28 |
| 5,583,420 A | * | 12/1996 | Rice et al. | 322/25 |
| 5,801,516 A | * | 9/1998 | Rice et al. | 322/37 |
| 7,453,240 B2 | * | 11/2008 | Yamauchi et al. | 322/12 |
| 7,960,849 B2 | * | 6/2011 | Lopez Taberna et al. | 290/44 |
| 7,978,445 B2 | * | 7/2011 | Ritter | 361/18 |

* cited by examiner

*Primary Examiner* — Nicholas Ponomarenko
(74) *Attorney, Agent, or Firm* — Kinney & Lange, P.A.

(57) ABSTRACT

A generator controller provides independent and redundant overvoltage protection to an associated generator. The generator controller monitors the generator output at a first point of a regulation and a second point of regulation. A generator control unit (GCU) provides overvoltage protection based on the generator output monitored at the first point of regulation, including at least one of tripping a first generator control relay (GCR) to remove excitation from an exciter winding and tripping a generator line contactor (GLC) to disconnect the generator output from a bus. A overvoltage protection unit (OPU) provides independent, redundant protection based on the generator output monitored at the second point of regulation, including at least one of tripping a second GCR to remove excitation from the exciter winding and tripping the GLC to disconnect the generator output from the bus.

19 Claims, 3 Drawing Sheets

INDEPENDENT, REDUNDANT OVERVOLTAGE PROTECTION FOR A GENERATOR

BACKGROUND

The present invention is related to generator controllers, and in particular to generator controllers for providing overvoltage protection.

Generator controllers, commonly referred to as generator control units (GCUs), regulate the operation of associated generators. For example, in a generator excited by an exciter winding, the GCU monitors the output voltage of the generator and regulates the current supplied to the exciter winding to regulate the output voltage to a desired value. In addition, the GCU provides protection against faults such as overvoltage faults. For example, if the circuit used to regulate the current supplied to the exciter winding fails, the GCU may trip a relay to disconnect power from the exciter winding, and may trip another relay to disconnect the generator output from a distribution bus to protect devices and components connected thereto.

SUMMARY

A generator controller provides independent and redundant overvoltage protection for an associated generator. The generator controller includes a generator control unit (GCU) for providing generator regulation and overvoltage protection, and an overvoltage protection unit (OPU) for providing independent and redundant overvoltage protection. The GCU monitors an output of the generator at a first point of regulation and in response regulates the generator output to a desired magnitude. In addition, the GCU provides overvoltage protection based on the monitored output of the generator that includes at least one of tripping a first generator control relay (GCR) to remove excitation from an exciter winding and tripping a generator line contactor (GLC) to disconnect the generator output from a bus. The OPU monitors the output of the generator at a second point of regulation and in response provides independent and redundant overvoltage protection that includes at least one of tripping a second generator control relay (GCR) to remove excitation from the exciter winding and tripping the GLC to disconnect the generator output from the bus. The OPU provides overvoltage protection for the entire abnormal power quality limit curve.

DETAILED DESCRIPTION

The present invention provides a generator controller that provides independent and redundant overvoltage (OV) protection for an associated generator. In particular, the generator controller includes a generator control unit (GCU) and an overvoltage protection unit (OPU). The GCU monitors the generator output voltage at a first point of regulation and provides regulation and OV protection in response to the monitored output voltage. The OPU independently monitors the generator output voltage at a second point of regulation to provide independent and redundant OV protection.

Figure 1:
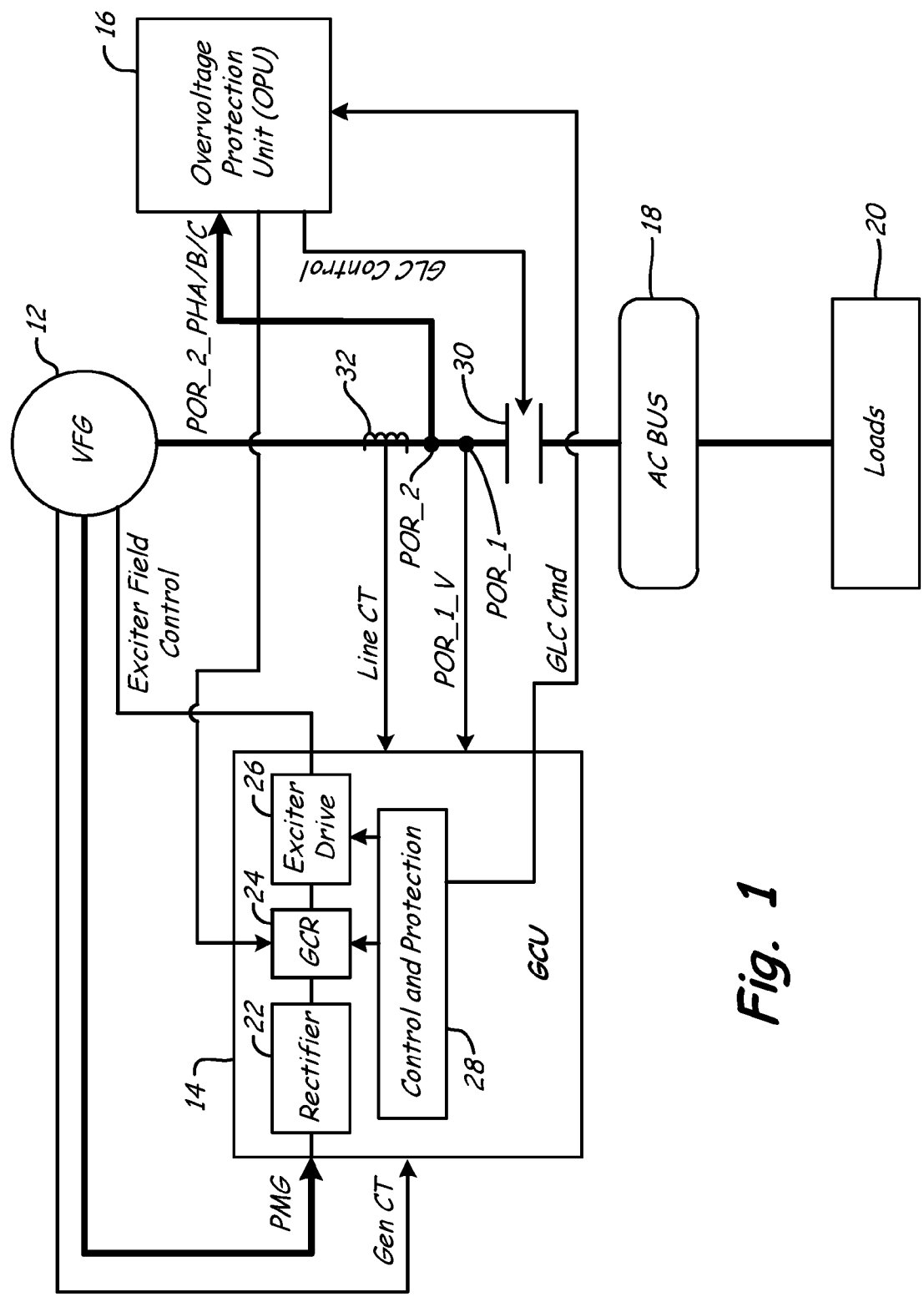
FIG. 1 is a block diagram of a generator system according to an embodiment of the present invention.

FIG. 1 is a block diagram of a generator system according to an embodiment of the present invention. Generator system 10 includes generator 12, generator control unit (GCU) 14, overvoltage protection unit (OPU) 16, alternating current (AC) bus 18 and one or more loads 20. Generator control unit (GCU) 14 includes rectifier 22, generator control relay 24, exciter drive 26, and control/protection circuit 28. In the embodiment shown in FIG. 1, generator 12 is a variable frequency wound-field generator, in which the main output of the generator is a function of the current (labeled 'exciter field control') supplied to the exciter field winding (not shown). In addition, the embodiment shown in FIG. 1 includes a permanent magnet generator (PMG, not shown) that generates an alternating current (AC) voltage (PMG) that is provided to GCU 14 and used to selectively excite the exciter field winding. The main output of generator 12 is provided via AC bus 18 to one or more of a plurality of loads 20. In other embodiments, other types of well-known generator topologies may be employed to excite the wound-field generator and regulate the output of said generator. In the embodiment shown in FIG. 1, as well as those shown in FIGS. 2A and 2B, lines indicative of power being transferred are shown in thicker outline, while lines representative of monitored signals or communication signals are shown in thinner outline.

In the embodiment shown in FIG. 1, GCU 14 regulates the output of generator 12. In particular, GCU 14 monitors the main output of generator 12 at a first point of regulation POR_1, and selectively controls the excitation (exciter field control) provided to the exciter field winding of generator 12. Excitation for the exciter winding is provided by the PMG portion of generator 12, which generates an alternating current (AC) voltage. The voltage supplied by the PMG is illustrated with a thicker line to indicate that power is being supplied to GCU 14 from the PMG portion. Rectifier 22 rectifies the AC voltage provided by the PMG and provides a rectified or DC voltage via GCR 24 to exciter drive 26. Control and protection circuit 28, which receives inputs regarding the monitored output voltage (POR_1_V) of generator 12, selectively controls the operation of exciter drive 26 in exciting the field winding. In one embodiment, exciter drive 26 may consist of one or more solid-state switches selectively turned On and Off by control/protection circuit 28 to provide the DC output provided by rectifier 22 to the exciter field winding of generator 12. For example, one embodiment may employ a single solid-state switch for controlling the application of power to the exciter field winding while other embodiments may make use of both a high-side and low-side switch for selectively applying power to the exciter field winding.

Independent and redundant protection of generator 12, AC bus 18 and loads 20 associated with generator 12 is provided by GCU 14 and OPU 16. GCU 14 provides protection against fault conditions such as overvoltage faults based on the output voltage of generator 12 monitored at first point of regulation (POR_1). OPU 16 provides protection against fault conditions based on the output voltage of generator 12 monitored at second point of regulation (POR_2). In response to the output voltage provided at the first point of regulation (POR_1), GCU 14 provides protection that includes at least one of removing excitation from exciter drive 26 via GCR CMD 24 and/or opening/tripping of generator line contactor (GLC) 30 (based on a command (GLC CMD) provided to OPU 16) to disconnect the output of generator 12 from AC bus 18. Similarly, OPU 16 monitors the output of generator 12 at a second point of regulation (POR_2) and provides protection that includes at least one or removing excitation from exciter drive 26 via GCR 24 (although as illustrated in FIG. 2B, GCR 24 may include independent contactor relays, one located local to GCU 14, one local to OPU 16 and/or opening/tripping of GLC 30 to disconnect the output of generator 12 from AC bus 18. In this way, GCU 14 and OPU 16 provide redundant overvoltage protection (i.e., both act to remove excitation from generator 12 and disconnect the generator from the AC bus) that is independent of the overvoltage protection provided by the other (i.e., both independently monitor at first and second points of regulations the output of the generator to determine whether an overvoltage condition exists).

In the embodiment shown in FIG. 1, independent protection is further provided by locating GCU 14 on a first line replaceable unit (LRU) and OPU 16 on a second LRU that is located separate from the first LRU. In other embodiments, however, they may be implemented on the same LRU or card.

Figure 2A:
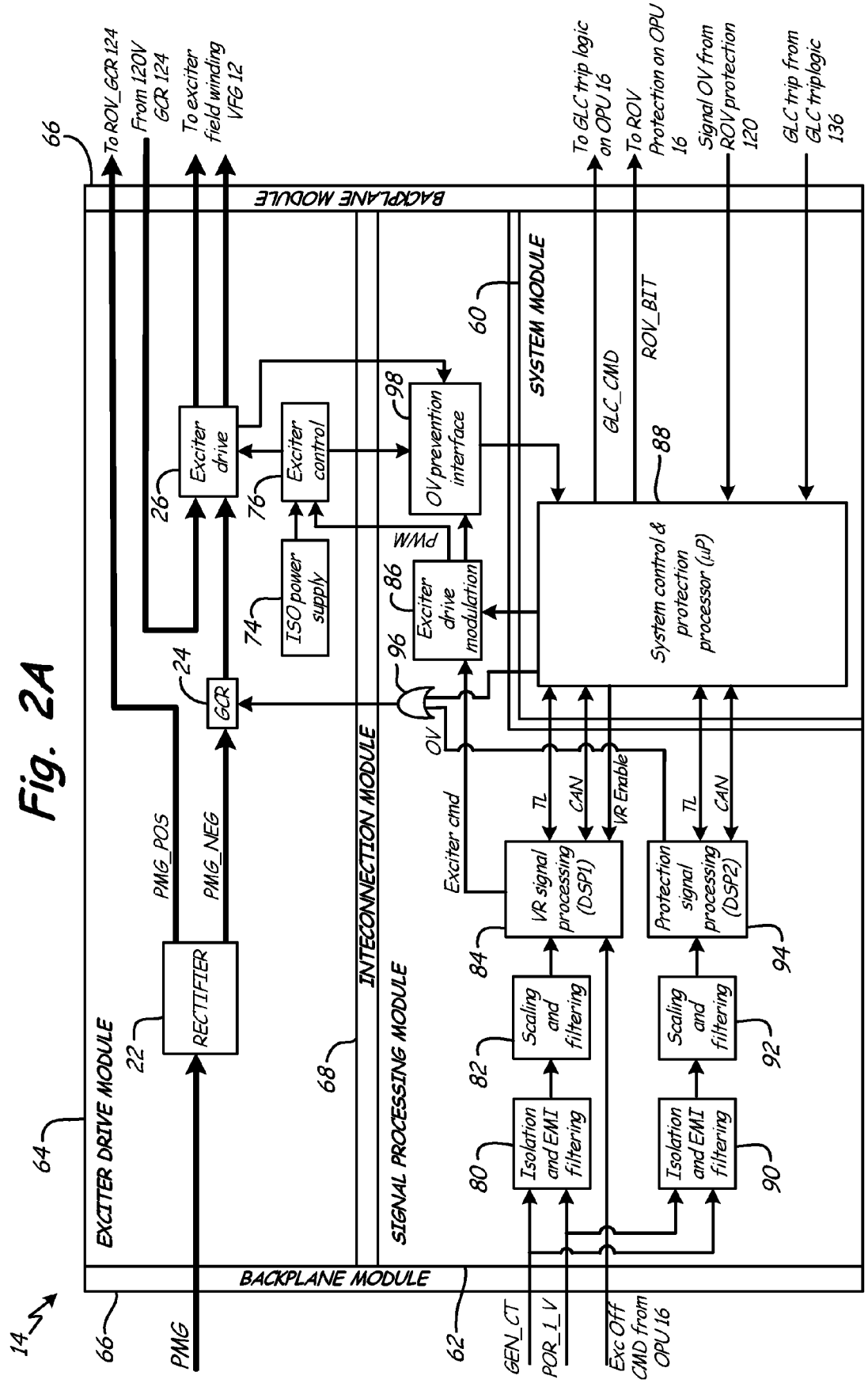
FIGS. 2A and 2B together form a block diagram of a generator controller that provides independent and redundant overvoltage protection to the generator system according to an embodiment of the present invention.
Figure 2B:
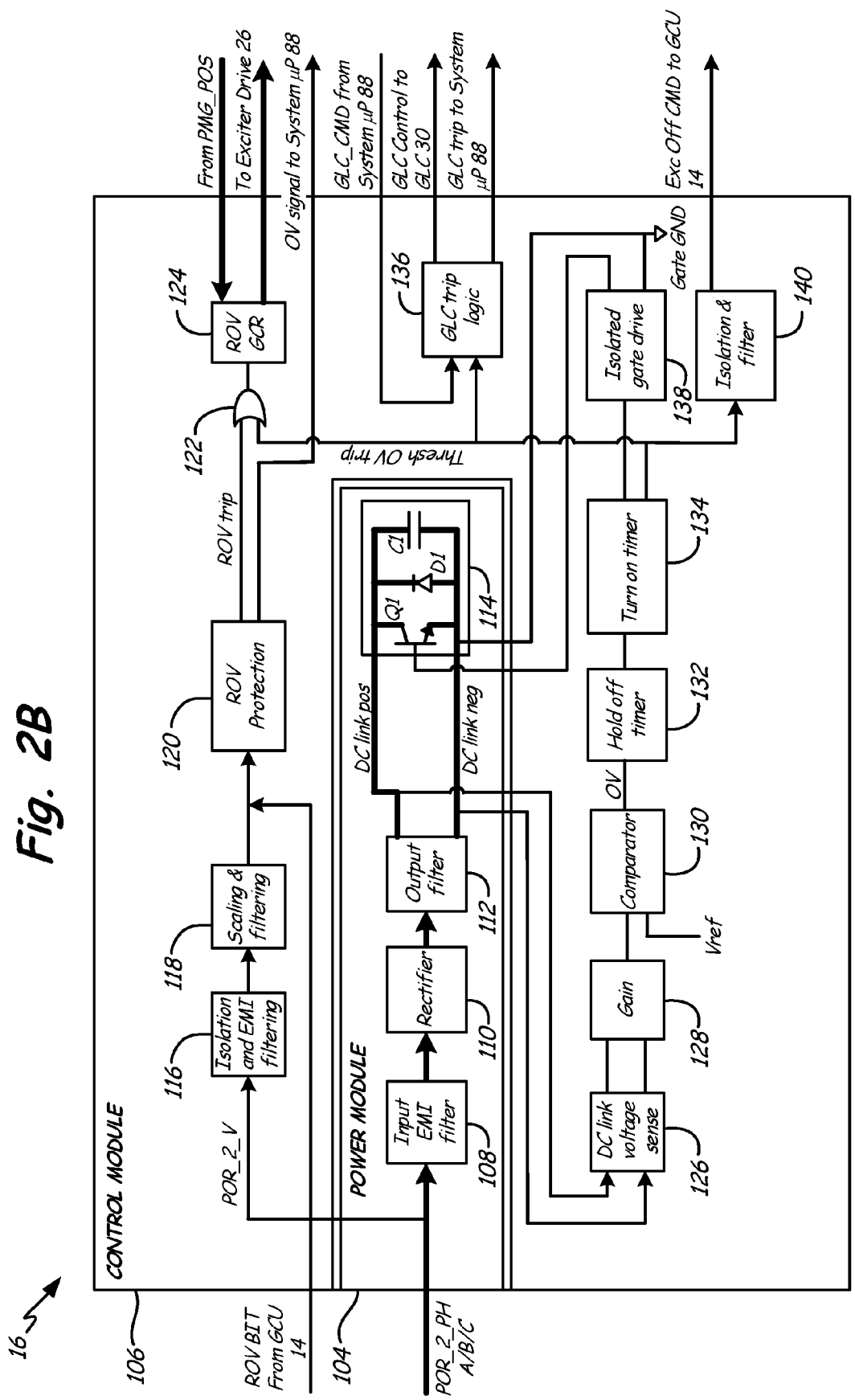

FIG. 2A is a block diagram of a generator control unit (GCU) implemented in a first LRU according to an embodiment of the present invention, and FIG. 2B is a block diagram of an overvoltage protection unit (OPU) implemented in a second LRU according to an embodiment of the present invention. As discussed with respect to FIG. 1, GCU 14 monitors the generator output voltage (POR_1_V) at a first point of regulation POR_1 and through various signal processing steps acts to regulate the generator output voltage by selectively regulating the excitation provided to VFG 12 via exciter drive 26 (as shown in FIG. 1). In addition, GCU 14 provides overvoltage protection in response to the monitored generator output voltage. Likewise, OPU 16 acts to provide independent and redundant overvoltage protection.

In the embodiment shown in FIG. 2A, GCU 14 includes a plurality of different modules, including system module 60, signal processing module 62, exciter drive module 64, backplane module 66, and interconnection module 68.

Exciter drive module 64 includes an input for receiving via backplane module 66 the AC voltage generated by the permanent magnet generator (PMG). Exciter drive module 64 includes rectifier 22, generator control relay (GCR) 24, and exciter drive 26, each of which are shown in FIG. 1. Exciter drive module 64 further includes, isolated power supply 74, and exciter control 76. Rectifier 22 rectifies the AC voltage received from PMG armature winding of VFG 12 (shown in FIG. 1) to a DC voltage. Exciter drive 26 is selectively turned On and Off based on commands received from exciter control 76 to regulate the current supplied to the exciter winding. A solid-state switch such as a metal-oxide semiconductor field-effect transistor (MOSFET) may be employed by exciter drive 26 to selectively control the application of power to an exciter field winding of VFG 12. In addition, GCR 24 is a protective relay used to disconnect power from being supplied to the exciter field winding in the event of an overvoltage condition. In this way, GCR 24 provides overvoltage protection in the event exciter drive 26 fails (e.g., fails closed, preventing regulation of current supplied to the exciter field winding). In the embodiment shown in FIG. 2A, GCR 24 is connected to the negative or return path of the DC voltage provided to exciter drive 26. In addition, the positive voltage path between rectifier 22 and exciter drive 26 is routed through OPU 16, which includes a second or redundant generator control relay (ROV GCR 124) that is controlled by OPU 16 to disconnect power from being supplied to the exciter field winding of VFG 12. In this way, redundancy is provided in removing power from the exciter field winding.

System module 60 and signal processing module 62 together provide much of the functionality described with respect to control/protection circuit 28 (shown in FIG. 1). In particular, signal processing module 62 receives as inputs the monitored generator current (Gen_CT), the monitored generator output voltage (POR_1_V) as monitored at the first point of regulation (POR_1), and an exciter off command (Exc_Off_Cmd) received from OPU 16. The monitored generator current and voltage are conditioned by isolation/EMI filter circuit 80 and scaling/filtering circuit 82, with the conditioned outputs being provided to voltage regulation (VR) processing circuit 84. The exciter off command is similarly provided to VR processing circuit 84. In the embodiment shown in FIG. 2A, VR processing circuit 84 is implemented with a digital signal processor (DSP). In response to the monitored generator current and voltage, VR processing circuit 84 generates an exciter command signal (Exciter_Cmd) that is provided to exciter drive modulator 86. Based on the received exciter command signal, exciter drive modulator 86 generates a pulse width modulated signal (PWM) that is provided to exciter control 76, which generates the drive signal supplied to exciter drive 26. In addition, VR processing circuit 84 communicates with system control and protection processor 88 regarding the status of the monitored generator outputs and exciter commands. In the embodiment shown in FIG. 2A, VR processing circuit 84 communicates with system control and protection processor 88 via a controller area network (CAN) bus and/or a UART Test Link (TL) bus, although in other embodiments various communication buses and protocols may be employed.

In addition, in the embodiment shown in FIG. 2A, VR processing circuit 84 receives an exciter off command from OPU 16. As described in further detail with respect to FIG. 2B, OPU 16 generates the exciter off command in response to a detected overvoltage fault condition. While OPU 16 takes independent steps to remove excitation from the exciter drive, the exciter off command further instructs VR processing circuit 84 to remove excitation by way of exciter drive 26.

In addition to voltage regulation, signal processing module 62 also provides overvoltage protection. The monitored generator current (Gen_CT) and the monitored generator output voltage (POR_1_V) are provided to isolation and EMI filter circuit 90 and scaling/filtering circuit 92. The conditioned outputs are provided to protection signal processing circuit 94. Once again, in the embodiment shown in FIG. 2A, protection signal processing circuit 94 is implemented as a digital signal processor. Based on the monitored generator current and generator output voltage, protection signal processing circuit 94 detects, among other fault conditions, overvoltage conditions. Detected fault conditions such as overvoltage faults are communicated to system control and protection processor 88. In response to a detected overvoltage condition, system control and protection processor 88 provides a command (GCR_CMD) to trip or open GCR 24 to remove excitation from the exciter winding 32 and thereby de-energize the generator. In the embodiment shown in FIG. 2A, protection and signal processing circuit 94 generates a fast trip signal (OV) that is provided via OR gate 96 to GCR 24. This provides for faster trip response as compared with communication of the trip signal via the CAN bus to system control processor 88 and subsequent trip command from processor 88.

In addition, system control and protection processor 88 provides in response to a detected overvoltage condition a command (GLC_CMD) to trip or open generator line contactor (GLC) 30 to disconnect the generator output from the bus. In the embodiment shown in FIGS. 2A and 2B, GLC trip logic 136 (shown in FIG. 2B) is maintained on OPU 16. In this way, GCU 14 provides regulation and overvoltage protection to generator 12. In the embodiment shown in FIG. 2B, system control and protection processor 88 further generates a redundant overvoltage command (ROV_BIT) for testing and/or opening the redundant overvoltage (ROV) GCR 124 (shown in FIG. 2B).

In the embodiment shown in FIG. 2B, system control and protection processor 88 receives inputs fro OPU 16, including an overvoltage signal (Signal OV) from the redundant overvoltage protection circuit 120 (shown in FIG. 2B) and a GLC trip signal from GLC trip logic 136 (also shown in FIG. 2B). Based on these signals, system control and protection processor 88 may take additional action within GCU 14, including tripping GCR 24 and or removing excitation from the exciter field winding via exciter drive 26.

As illustrated in the embodiment shown in FIG. 2B, OPU module 52 operates to provide independent and redundant overvoltage protection to GCU 14. For performing these operations, OPU 16 includes power module 104 and control module 106. In the embodiment shown in FIG. 2B, power module 104 includes power components capable of handling and operating on the output power of generator 12 (as opposed to GCU 14, which only monitors the generator output voltage). Control module 106 includes components for monitoring the output voltage provided by the generator and providing the desired overvoltage protection.

To maintain independence between OPU 16 and GCU 14. OPU 16 is connected to the generator output via second point-of-regulation (POR_2). In this way, a failure with respect to monitoring the voltage at the first point of regulation (POR_1) does not result in a catastrophic loss of overvoltage protection. Although no regulation of the generator output voltage occurs based on this second monitored voltage, it is referred to herein as the second point of regulation (POR_2) to distinguish from the first point of regulation (POR_1).

Power module 104 is connected to receive power from generator 12 via the second point of regulation (labeled 'POR2_PHA/B/C' to indicate an output power received from generator 12). The generator output is filtered by EMI filter 108, rectified by three-phase rectifier 110, and further conditioned and filtered by output filter 112 to generate a DC output voltage that is provided to voltage clamping circuit 114. In the embodiment shown in FIG. 2B, voltage clamping circuit 114 includes insulated gate bipolar transistor (IGBT Q1), diode D1, and capacitor C1, wherein IGBT Q1 is connected across DC output provided by output filter 112. During normal operations, IGBT Q1 remains Off such that the DC output voltage is maintained across capacitor C1. Once capacitor C1 is charged, power module 104 draws a minimal amount of power from the generator output via the second point of regulation POR2. However, in response to a detected overvoltage condition, IGBT Q1 is turned On to create a low-resistance path between the positive DC link and negative DC link, dissipating a large amount of energy provided by generator 12 across IGBT Q1. In this way, the output voltage of generator 12 is reduced. To prevent damage to voltage clamping circuit 114, IGBT Q1 is only turned On for a short amount of time, to temporarily dissipate the output voltage of generator 12 while other protection features are activated by GCU 14 or OPU 16.

Control module 106 controls the operation of voltage clamping circuit 114 as well as other overvoltage protection measures provided by OPU 16. In the embodiment shown in FIG. 2B, control module 106 includes isolation and EMI filter 116, scaling/filter circuit 118, redundant OV protection 120, logical OR gate 122, redundant overvoltage generator control relay (ROV GCR) 124, DC link voltage sense 126, gain circuit 128, threshold voltage comparator 130, hold-off timer 132, turn-on timer 134, generator line contactor (GLC) trip logic 136, isolated gate drive 138, and isolation filter 140.

In one aspect of the overvoltage protection provided by OPU 16, the voltage of the generator output provided to power module 106 is monitored (POR_2_V) for redundant OV protection circuit 120 and used to trip redundant generator control relay (ROV GCR) 124. Because the overvoltage protection is provided based on the output voltage at the second point of regulation (POR_2), the overvoltage protection provided by OPU 16 is independent to the overvoltage protection provided by GCU 14. In addition, the overvoltage protection is redundant to the overvoltage protection provided by GCU 14.

In particular, the monitored generator output voltage (POR_2_V) is conditioned by isolation/EMI filter 116 and scaling/filter circuit 118 to generate a conditioned signal representing the monitored generator output voltage at the second point of regulation (POR_2). Redundant overvoltage protection (ROV) circuit 120 detects overvoltage conditions based on the monitored generator output voltage. In one embodiment, ROV protection circuit 120 employs an inverse time-based trip curve to detect overvoltage conditions. That is, the magnitude of the monitored output voltage determines the duration of time before a trip signal is generated. A high monitored output voltage results in a relatively short trip duration. Conversely, a low monitored output voltage results in a relatively long trip duration such that the trip time is inversely related to the magnitude of the monitored output voltage.

In response to a detected overvoltage condition, ROV protection circuit 120 generates a command (ROV trip) that is communicated via OR gate 122 to ROV GCR 124. The trip signal opens or trips ROV GCR 124, thereby disconnecting power from exciter drive 26. In addition, ROV circuit 120 communicates detection of the overvoltage condition to GCU 14.

In the embodiment shown in FIG. 2B, control module 106 provides threshold overvoltage protection based on monitoring of the DC link voltage provided to voltage clamping circuit 114. The DC link voltage is sensed by DC link voltage sense circuit 126. The sensed DC link voltage, which is representative of the generator output voltage, is conditioned by gain circuit 128 and provided to comparator circuit 130 for comparison to a threshold voltage value (Vref). In response to the monitored DC link voltage exceeding the threshold voltage, an overvoltage signal (OV) is generated. In contrast with redundant overvoltage protection circuit 120 (or protection signal processing provided by GCU 14), which may base overvoltage detection on inverse time-based trip curve, comparator circuit 130 operates to generate an overvoltage signal in response to the monitored voltage exceeding a certain level.

In the embodiment shown in FIG. 2B, two timers (hold-off timer 132 and turn-on timer 134) are employed to control the operation of voltage clamping circuit 114. Hold-off timer 132 ensures that the overvoltage condition is not a transient event by requiring the overvoltage condition to persist for a period of time (e.g., 10 microseconds). The hold-off time is used to prevent transient events from tripping an overvoltage condition, but is still short enough (e.g., 10 microseconds) to prevent the overvoltage condition from damaging connected components. If the overvoltage condition persists for the hold-off time, then hold-off timer 132 provides an overvoltage signal to turn-on timer 134.

In the embodiment shown in FIG. 2B, the output generated by turn-on timer 134 serves three functions. First, an output (Thresh OV trip) is provided to isolated gate drive 138, which operates to turn on IGBT Q1 for the duration of time defined by turn-on timer 134 (e.g., 200 milliseconds). In this way, the on-time of IGBT Q1 is limited to prevent damage to IGBT Q1. Second, output (Thresh OV trip) is provided to GLC trip logic 136, which operates to trip or disconnect GLC 30 (shown in FIG. 1) in response to the detected overvoltage condition. Generator line contactor (GLC) trip logic 136 may also trip or open GLC 30 based on a command (GLC_CMD) provided by GCU 14 in response to an overvoltage condition detected at the first point of regulation (POR_1). Third, output (Thresh OV trip) is provided as the other input to OR gate 122, which trips or disconnects ROV GCR 124.

In this way, GCU 14 acts to regulate the output of the generator and provide protection that includes at least one of tripping first generator control relay (GCR) 72 to remove excitation from exciter winding 32, and tripping GLC 30 to disconnect the generator output from a bus. OPU 16 provides independent and redundant overvoltage protection that includes at least one of tripping redundant generator control relay (ROV GCR) 124 to remove excitation from exciter winding 32, tripping GLC 30 to disconnect the generator output from the bus, and immediately reducing the voltage at the output of generator 12 by activating voltage clamp 114.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A generator controller for providing independent, redundant overvoltage protection for an associated generator, the generator controller comprising:
   a generator control unit (GCU) that monitors an output of the generator at a first point of regulation and in response regulates the generator output and provides overvoltage protection that includes at least one of tripping a first generator control relay (GCR) to remove excitation from an exciter winding, and tripping a generator line contactor (GLC) to disconnect the generator output from a bus; and
   an overvoltage protection unit (OPU) that monitors the output of the generator at a second point of regulation and in response provides overvoltage protection that includes at least one of tripping a second generator control relay (GCR) to remove excitation from the exciter winding and tripping the GLC to disconnect the generator output from the bus.

2. The generator controller of claim 1, wherein the GCU includes an overvoltage protection circuit that generates a first overvoltage command to trip the first GCR in response to the generator output monitored at the first point of regulation and the OPU includes a redundant overvoltage protection circuit that generates a second overvoltage command to trip the second GCR in response to the generator output monitored at the second point of regulation.

3. The generator controller of claim 2, wherein the overvoltage protection circuit and the redundant overvoltage protection circuit detect overvoltage conditions based on an inverse time-based trip curve.

4. The generator controller of claim 1, wherein the OPU further includes:
   a rectifier that receives the generator output provided at the second point of regulation and converts the generator output from an alternating current (AC) waveform to a direct current (DC) voltage for provision to a DC link; and
   a voltage clamping circuit connected to receive the DC voltage provided on the DC link, the voltage clamping circuit including a capacitor and a switching device connected across the DC link, wherein the OPU turns On the switching device to dissipate energy on the output of the generator.

5. The generator controller of claim 4, wherein the OPU monitors the DC voltage on the DC link and generates a third overvoltage command in response to the monitored DC voltage on the DC link exceeding a threshold value.

6. The generator controller of claim 5, wherein in response to the third overvoltage command, the switching device is turned On for a selected duration of time.

7. The generator controller of claim 6, wherein the selected duration of time is equal to approximately 200 milliseconds.

8. The generator controller of claim 6, wherein the switching device is turned On less than 1 millisecond after the monitored voltage on the DC link exceeds the threshold value.

9. The generator controller of claim 5, wherein in response to the third overvoltage command, the second GCR is tripped to remove excitation from the exciter winding.

10. The generator controller of claim 5, wherein in response to the third overvoltage command, the GLC is tripped to disconnect the generator output from the bus.

11. A method of providing independent, redundant overvoltage protection for a generator, the method comprising:
    monitoring a first output voltage of the generator at a first point of regulation;
    detecting a first overvoltage condition based on the monitored first output voltage;
    providing, in response to the detected first overvoltage condition at the first point of regulation, overvoltage protection that includes at least one of tripping a first generator control relay (GCR) to remove excitation from an exciter winding, and tripping a generator line contactor (GLC) to disconnect the generator output from a bus;
    monitoring a second output voltage of the generator at a second point of regulation;
    detecting a second overvoltage condition based on the monitored second output voltage; and
    providing, in response to the detected second overvoltage condition at the second point of regulation, overvoltage protection that includes at least one of tripping a second generator control relay (GCR) to remove excitation from the exciter winding, and tripping the GLC to disconnect the generator output from the bus.

12. The method of claim 11, wherein the steps of detecting the first and second overvoltage conditions based on the monitored first and second output voltages, respectively, is based on an inverse time-based trip curve.

13. The method of claim 11, further including:
    receiving alternating current (AC) power from the generator at the second point of regulation;
    converting the received AC power to direct current (DC) voltage supplied on a DC link to a voltage clamp circuit;
    monitoring the DC voltage on the DC link;
    detecting a third overvoltage condition based on a comparison of the monitored DC voltage to a threshold voltage; and
    activating the voltage clamp circuit for a duration of time in response to the detected third overvoltage condition.

14. The method of claim 13, further including:
tripping the second GCR to remove excitation from the exciter winding in response to the detected third overvoltage condition.

15. The method of claim 13, further including:
tripping the GLC to disconnect the generator output from the bus in response to the detected third overvoltage condition.

16. A generator system comprising:
a generator having at least an exciter field winding and an armature main winding for providing a generator output; and
a generator controller connecting to monitor the generator output at a first point of regulation and at a second point of regulation, wherein the generator controller comprises:
　a generator control unit (GCU) that monitors the generator output at the first point of regulation, regulates the generator output in response to the monitored generator output by selectively controlling excitation provided to the exciter field winding, and provides overvoltage protection that includes at least one of tripping a first generator control relay (GCR) to remove excitation from the exciter winding, and tripping a generator line contactor (GLC) to disconnect the generator output from a bus; and
　an overvoltage protection unit (OPU) that monitors the generator output at the second point of regulation and in response provides overvoltage protection that includes at least one of tripping a second generator control relay (GCR) to remove excitation from the exciter winding and tripping the GLC to disconnect the generator output from the bus.

17. The generator system of claim 16, wherein the GCU includes an overvoltage protection circuit that generates a first overvoltage command to trip the first GCR in response to the generator output monitored at the first point of regulation and the OPU includes a redundant overvoltage protection circuit that generates a second overvoltage command to trip the second GCR in response to the generator output monitored at the second point of regulation, wherein the overvoltage protection circuit of the GCU and the redundant overvoltage protection circuit of the OPU detect overvoltage conditions based on an inverse time-based trip curve.

18. The generator system of claim 17, wherein the OPU further includes:
　a rectifier that receives the generator output provided at the second point of regulation and converts the generator output from an alternating current (AC) waveform to a direct current (DC) voltage for provision to a DC link; and
　a voltage clamping circuit connected to receive the DC voltage provided on the DC link, the voltage clamping circuit including a capacitor and a switching device connected across the DC link, wherein the OPU turns On the switching device to dissipate energy on the output of the generator.

19. The generator system of claim 18, wherein the OPU monitors the voltage on the DC link and generates a third overvoltage command in response to the monitored DC link voltage exceeding a threshold value, wherein in response to the third overvoltage command the switching device is turned On for a selected duration of time, the second GCR is tripped to remove excitation from the exciter winding, and the GLC is tripped to disconnect the generator output from the bus.

* * * * *